United States Patent
Okada

(10) Patent No.: US 9,733,092 B2
(45) Date of Patent: Aug. 15, 2017

(54) VEHICLE POSITION DETECTION DEVICE AND PROGRAM

(71) Applicant: Clarion Co., Ltd., Saitama-shi, Saitama (JP)

(72) Inventor: Kazuhiro Okada, Ebina (JP)

(73) Assignee: Clarion Co., Ltd., Saitama-shi (JP)

( * ) Notice: Subject to any disclaimer, the term of this patent is extended or adjusted under 35 U.S.C. 154(b) by 0 days.

(21) Appl. No.: 14/404,414

(22) PCT Filed: Apr. 30, 2013

(86) PCT No.: PCT/JP2013/062630
§ 371 (c)(1),
(2) Date: Nov. 26, 2014

(87) PCT Pub. No.: WO2013/179853
PCT Pub. Date: Dec. 5, 2013

(65) Prior Publication Data
US 2015/0149072 A1    May 28, 2015

(30) Foreign Application Priority Data
May 30, 2012 (JP) .................... 2012-122680

(51) Int. Cl.
*G01C 21/12* (2006.01)
*G01C 21/10* (2006.01)
(Continued)

(52) U.S. Cl.
CPC .......... *G01C 21/26* (2013.01); *G01C 21/30* (2013.01)

(58) Field of Classification Search
CPC .... G01C 21/3492; G01C 21/10; G01C 21/32; G01C 21/20; G01C 21/34; G01C 21/28;
(Continued)

(56) References Cited

U.S. PATENT DOCUMENTS 3,700,379 A * 10/1972 Robertson ............... B21B 37/60
                                                       318/561
5,941,934 A    8/1999 Sato
(Continued)

FOREIGN PATENT DOCUMENTS

JP    4-353715 A    12/1992
JP    8-61969 A     3/1996
(Continued)

OTHER PUBLICATIONS

International Search Report dated Jul. 30, 2013 with English translation (Four (4) pages).

*Primary Examiner* — Jelani Smith
*Assistant Examiner* — Luis A Martinez Borrero
(74) *Attorney, Agent, or Firm* — Crowell & Moring LLP

(57) ABSTRACT

To acquire a direction error of a vehicle so that a more appropriate result is acquired in subsequent processing, a vehicle position detection device includes: a start/end point calculation part for acquiring a turning start point on a pre-turning link, and acquiring a turning end point on a post-turning link; a virtual link generation part for acquiring a virtual link connecting between the turning start point and the turning end point; a link direction calculation part for calculating a virtual link direction that is a direction at a predetermined position on the virtual link; and an error calculation part for using the virtual link direction to calculate a direction error of a vehicle direction.

10 Claims, 12 Drawing Sheets

(51) Int. Cl.
*G01C 21/26* (2006.01)
*G01C 21/30* (2006.01)

(58) Field of Classification Search
CPC .... G01C 21/36; G01C 21/26; G01C 21/3415;
G01C 21/30; G01C 21/3461; G01C
21/3453; G01C 21/3667; G01C 21/3623;
G01C 21/3629; G01C 21/3632; G01C
21/3638; G01C 21/3644; G01C 21/3676;
G01C 21/3691
USPC .... 701/408, 41, 28, 1, 124, 36, 42, 400, 49,
701/533, 70, 446, 518, 532, 454, 21, 409,
701/411, 417, 445, 469, 470, 117, 414,
701/418
See application file for complete search history.

(56) References Cited

U.S. PATENT DOCUMENTS

| | | | | |
|---|---|---|---|---|
| 6,023,653 A * | 2/2000 | Ichimura | ................ | G01C 21/30 701/446 |
| 6,070,121 A * | 5/2000 | Matsuda | ................ | B60T 8/172 340/995.22 |
| 6,230,083 B1 * | 5/2001 | Matsuda | ................ | G01C 21/26 340/995.1 |
| 6,268,825 B1 * | 7/2001 | Okada | ................ | B60T 8/172 342/357.52 |
| 6,343,253 B1 * | 1/2002 | Matsuura | ........... | B60K 31/0066 340/438 |
| 6,473,770 B1 * | 10/2002 | Livshutz | ................ | G01C 21/32 701/414 |
| 6,766,247 B2 * | 7/2004 | Mosis | ................ | G01C 21/30 340/988 |
| 7,233,851 B2 * | 6/2007 | Iwazaki | ............ | B62D 15/0285 701/23 |
| 7,474,961 B2 * | 1/2009 | Ibrahim | ................ | G01C 21/30 701/446 |
| 7,522,091 B2 * | 4/2009 | Cong | ................ | B60K 31/0008 342/107 |
| 7,647,177 B2 * | 1/2010 | Schmidt | ................ | G01S 13/876 342/451 |
| 7,653,483 B2 * | 1/2010 | Schmidt | ................ | G01S 13/876 340/426.16 |
| 7,720,598 B2 * | 5/2010 | Schmidt | ................ | G01S 5/0215 340/988 |
| 7,774,121 B2 * | 8/2010 | Lee | ................ | B60W 30/045 701/70 |
| 7,831,389 B2 * | 11/2010 | Yamada | ................ | G01C 21/30 701/412 |
| 8,285,485 B2 * | 10/2012 | Montealegre | ...... | G01C 21/3461 701/532 |
| 8,583,355 B2 * | 11/2013 | Fukumoto | ............ | B60W 40/06 701/467 |
| 8,583,366 B2 * | 11/2013 | Iida | ........................ | G06F 15/18 701/450 |
| 9,002,630 B2 * | 4/2015 | Suzuki | ................ | G01S 13/931 701/300 |
| 9,068,856 B2 * | 6/2015 | Dorum | ................ | G01C 21/32 |
| 9,069,655 B2 * | 6/2015 | Suzuki | ................ | G06F 12/02 |
| 9,109,919 B2 * | 8/2015 | Yabe | ................ | G01C 21/3658 |
| 9,157,749 B2 * | 10/2015 | Aoki | ................ | G01C 21/30 |
| 9,448,074 B2 * | 9/2016 | Mizuno | ................ | G09B 29/106 |
| 2001/0018636 A1 * | 8/2001 | Mizuno | ................ | G01C 21/26 701/518 |
| 2003/0195703 A1 * | 10/2003 | Ibrahim | ............ | B60K 31/0008 701/301 |
| 2006/0217882 A1 * | 9/2006 | Takashima | ......... | G01C 21/3632 701/457 |
| 2007/0078594 A1 * | 4/2007 | Mori | ................ | G01C 21/00 701/408 |
| 2007/0168119 A1 * | 7/2007 | Mori | ................ | G01C 21/30 701/507 |
| 2007/0198177 A1 * | 8/2007 | Yamada | ................ | G01C 21/30 701/412 |
| 2007/0203638 A1 * | 8/2007 | Tooyama | ............ | G08G 1/0969 701/457 |
| 2008/0071471 A1 * | 3/2008 | Sumizawa | ......... | G01C 21/3415 701/414 |
| 2009/0248768 A1 * | 10/2009 | Fukumoto | ............ | B60W 10/06 708/207 |
| 2009/0287410 A1 * | 11/2009 | Kobayashi | ............ | G01C 21/30 701/533 |
| 2009/0300067 A1 * | 12/2009 | Denaro | ................ | B60W 40/072 |
| 2010/0104139 A1 * | 4/2010 | Kuehnle | ................ | G06K 9/00798 382/106 |
| 2010/0262359 A1 * | 10/2010 | Motoyama | ............ | G01C 21/32 701/532 |
| 2010/0287207 A1 * | 11/2010 | Motoyama | ........ | G06F 17/30241 707/803 |
| 2010/0318289 A1 * | 12/2010 | Sambongi | ............ | G01C 21/165 701/533 |
| 2011/0218724 A1 * | 9/2011 | Iida | ........................ | G06F 15/18 701/70 |
| 2012/0072050 A1 * | 3/2012 | Naka | ................ | B60W 30/09 701/1 |

FOREIGN PATENT DOCUMENTS

| | | |
|---|---|---|
| JP | 8-334359 A | 12/1996 |
| JP | 2005-132291 A | 5/2005 |
| JP | 2007-192583 A | 8/2007 |
| JP | 2012-2753 A | 1/2012 |

* cited by examiner

FIG. 12

| | | | 500 |
|---|---|---|---|
| 501 | 502 | 503 | 504 |
| LINK WIDTH α1 OF LINK A | LINK WIDTH α2 OF LINK B | CONNECTION ANGLE BETWEEN LINK A AND LINK B | VIRTUAL LINK |
| * | * * * | * * * | ◯ |
| * * | * * | * * * | ◯ |
| * * * | * | * * * | ◯ |

VEHICLE POSITION DETECTION DEVICE AND PROGRAM

TECHNICAL FIELD

The present invention relates to a vehicle position detection device and a program. The present invention claims priority to Japanese Patent Application No. 2012-122680 filed on May 30, 2012, the content of which is incorporated by reference herein in designated states where the incorporation of documents by reference is approved.

BACKGROUND ART

A technology for a navigation device of acquiring a curvature on a curve section, and calculating a current position in the curve section based on a transition of the curvature is disclosed in Patent Literature 1.

CITATION LIST

Patent Literature

[PTL 1] JP 2007-192583 A

SUMMARY OF INVENTION

Technical Problem

However, the above-mentioned technology acquires the curvature for a link constituted by line segments without taking a road width into consideration. A curvature close to a turning behavior of a vehicle is thus hard to acquire. Even if a difference between a link direction calculated by using the curvature and a vehicle direction calculated by means of dead reckoning is set as a direction error for subsequent processing (such as map matching processing), an appropriate result cannot be acquired.

The present invention has an object to acquire a direction error of a vehicle so that a more appropriate result is acquired in subsequent processing.

Solution to Problem

In order to solve the problem described above, according to one embodiment of the present invention, there is provided a vehicle position detection device, including: a start/end point calculation part for acquiring a turning start point on a pre-turning link, and acquiring a turning end point on a post-turning link; a virtual link generation part for acquiring a virtual link connecting between the turning start point and the turning end point; a link direction calculation part for calculating a virtual link direction that is a direction at a predetermined position on the virtual link; and an error calculation part for using the virtual link direction to calculate a direction error of a vehicle direction.

Advantageous Effects of Invention

According to one embodiment of the present invention, it is possible to acquire the direction error of the vehicle so that a more appropriate result is acquired in the subsequent processing.

BRIEF DESCRIPTION OF THE DRAWINGS

FIG. 12 shows virtual link model information according to a modified example of the present invention.

DESCRIPTION OF EMBODIMENT

A description is now given of an embodiment of the present invention.

Figure 1:
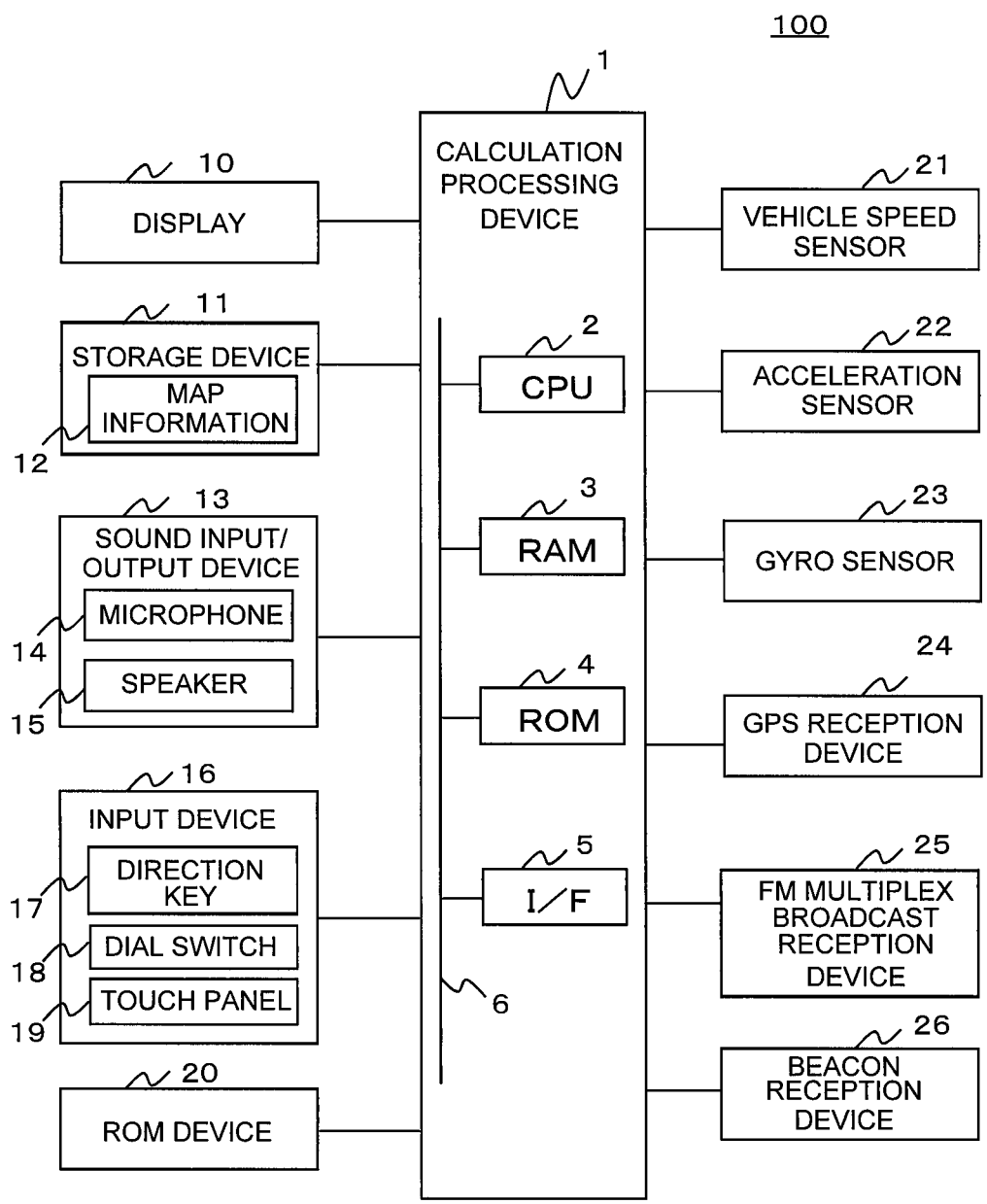
FIG. 1 is a schematic diagram of a navigation device 1 according to an embodiment of the present invention.

FIG. 1 is a schematic configuration diagram of a navigation device 100 functioning as a vehicle position detection device according to this embodiment. The navigation device 100 includes a calculation processing device 1, a display 10, a storage device 11, a sound input/output device 13, an input device 16, a ROM device 20, a vehicle speed sensor 21, an acceleration sensor 22, a gyro sensor 23, a GPS reception device 24, an FM multiplex broadcast reception device 25, and a beacon reception device 26. Moreover, those respective devices and sensors are configured to be connected with one another via a bus 6 for passing or receiving data from one another.

The navigation device 100 is a device for realizing so-called navigation functions such as identification of an own vehicle position on a map, display of a map and traffic information, search for recommended route, and a route guidance.

The calculation processing device 1 is a central unit for carrying out various types of processing for the navigation device 100. The calculation processing device 1 uses information (hereinafter referred to as "vehicle sensor information") output from various sensors such as the vehicle speed sensor 21, the acceleration sensor 22, and the gyro sensor 23, the GPS reception device 24, and the like to calculate the own vehicle position on the map, a position error and a direction error with respect to a neighboring link, and the like. Moreover, the calculation processing device calculates predetermined information such as the own vehicle position, the position error, and the direction error, and uses the predetermined information to carry out map matching processing.

Moreover, when the calculation processing device 1 determines that the own vehicle is turning based on the vehicle sensor information, the calculation processing device 1 generates a circular virtual link having a predetermined curvature radius between links neighboring each other, and calculates the direction thereof. The calculated direction of the virtual link is used for, for example, calculation of the direction error used for the map matching processing. It should be noted that the virtual link is detailed later.

Moreover, the calculation processing device 1 temporarily stores the information such as the calculated own vehicle position and direction error in a memory such as a RAM 3.

Moreover, the calculation processing device 1 uses map information 12 stored in the storage device 11 to search for a recommended route connecting a start location and a destination location with each other.

Moreover, the calculation processing device 1 converts the map information 12, traffic information, route information, and the like to be displayed in a display area of the display 10 into graphics, and outputs the graphics to the display 10.

Moreover, the calculation processing device 1 generates sound information for the route guidance, and outputs the sound information to a speaker 15.

It should be noted that the calculation processing device 1 includes a central processing unit (CPU) 2 for carrying out various processing such as numerical calculation and control for respective devices and sensors, the random access memory (RAM) 3 for temporarily storing programs, data, and calculation results, a read only memory (ROM) 4 for storing programs and data, and an interface (I/F) 5 for connecting various hardware with the calculation processing device with each other. Moreover, the CPU 2, the RAM 3, and the ROM 4 are connected one another via the bus 6.

The display 10 is a unit for displaying graphics information generated by the calculation processing device 1 on the display area, and includes a liquid crystal display or an organic EL display.

The storage device 11 is constituted by a storage medium which can be at least read and written such as a hard disk drive (HDD) and a nonvolatile memory card. The storage device 11 stores information such as the map information 12.

Figure 2:
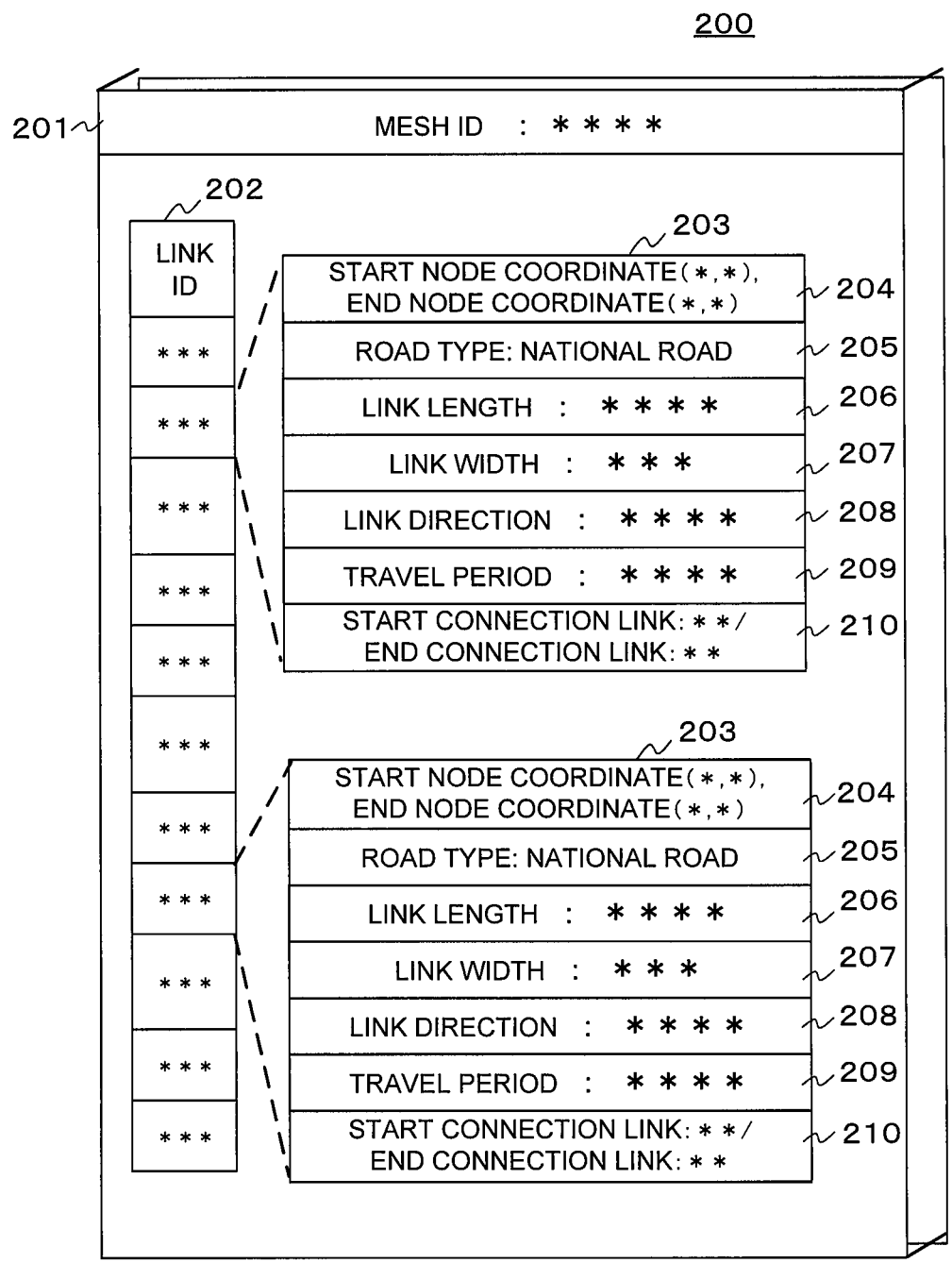
FIG. 2 shows map information according to the embodiment of the present invention.

FIG. 2 shows an example of the map information. The map information 12 includes area information for storing link information on roads on a map and the like. In area information 200, a link ID 202 and link information 203 of a road included in each mesh are associated with each other for each mesh ID 201 for identifying an area on the map.

Moreover, the link information 203 stores location coordinates 204 of a start node and an end node representing both ends of a road, road type information 205 representing a type of the road such as a national road, a toll road, and a prefectural road, link length information 206 representing a length of the road, a link width information 207 representing a width of the road, link direction information 208 representing a direction of the road, travel period information 209 representing a period required to pass the road, and start connection link/end connection link information 210 for storing link IDs of other roads connected respectively to the start node and the end node of the road.

The sound input/output device 13 includes a microphone 14 as a sound input device and the speaker 15 as a sound output device. The microphone 14 acquires an external sound of the navigation device 10 such a voice uttered by the user. Moreover, the speaker 15 outputs a message generated by the calculation processing device 1 and directed to the user as a sound signal.

The input device 16 is a user interface for the navigation device to receive an instruction from the user. Specifically, the input device 16 is constituted by a direction key 17, a dial switch 18, a touch panel 19, and other hardware switches (not shown) such as a scale change key.

The ROM device 20 is constituted by a storage medium which can be at least read such as a read only memory (ROM) including a CD-ROM and a DVD-ROM, and an integrated circuit (IC) card. Movie information, sound information, and the like are stored in the storage medium.

The vehicle speed sensor 21, the acceleration sensor 22, the gyro sensor 23, and the GPS reception device 24 are used to detect the own vehicle position of a vehicle on which the navigation device 100 is installed.

The vehicle speed sensor 21 outputs information used to calculate a vehicle speed. Specifically, the vehicle speed sensor 21 converts the detected number of revolutions of a wheel into a pulse signal, and outputs predetermined vehicle speed information such as the number of pulse signals in a predetermined period.

The acceleration sensor 22 outputs a predetermined detection signal in response to an acceleration in a longitudinal direction of the vehicle at a constant cycle. For example, the acceleration sensor 22 outputs a positive signal when the acceleration of the vehicle is increasing, and outputs a negative signal when the deceleration is occurring.

The gyro sensor 23 is constituted by an optical fiber gyro or an oscillation gyro, detects an angular velocity by a rotation of a mobile body, and generates and outputs predetermined angular velocity information.

The global positioning system (GPS) reception device 24 measures a current location, a travel speed, and a travel direction of a vehicle by receiving a signal from each of the GPS satellites, and measuring a distance between the vehicle and each of the GPS satellites and a change rate of the distance for three or more satellites.

The FM multiplex broadcast reception device 25 receives an FM multiplex broadcast signal transmitted from an FM station such as outline current traffic information, traffic control information, service area/parking area (SA/PA) information, parking lot information, and weather information of vehicle information communication system (VICS) information, and character information provided by a radio station as FM multiplex general information.

The beacon reception device 26 receives the VICS information and the like such as outline current traffic information, traffic control information, service area/parking area (SA/PA) information, parking lot information, weather information, and emergency information. For example, the beacon reception device is constituted by an optical beacon for optical communication, or a radio beacon for radio wave communication.

A description is now given of functional blocks of the navigation device 100 according to this embodiment. It should be noted that the functional blocks of the navigation device 100 are constructed by executing a predetermined program read by the CPU 2 implemented in the calculation processing device 1. For that purpose, the programs for realizing the processing of the respective functional parts are stored in the ROM 4.

Moreover, the functional blocks of the navigation device 100 are classified depending on major processing contents for the sake of understanding of functions of the navigation device 100 realized according to this embodiment. Moreover, the classification method and the name of the respective functions do not restrict the present invention. It should be noted that each configuration of the navigation device 100 can be further classified into a larger number of components depending on processing contents. Moreover, the configuration may be classified so that a single component can carry out more pieces of the processing.

Moreover, the functional parts of the navigation device 100 can be constructed by hardware (such as ASIC). Moreover, the processing of each of the functional parts may be carried out by a single piece of hardware or a plurality of pieces of hardware.

Figure 3:
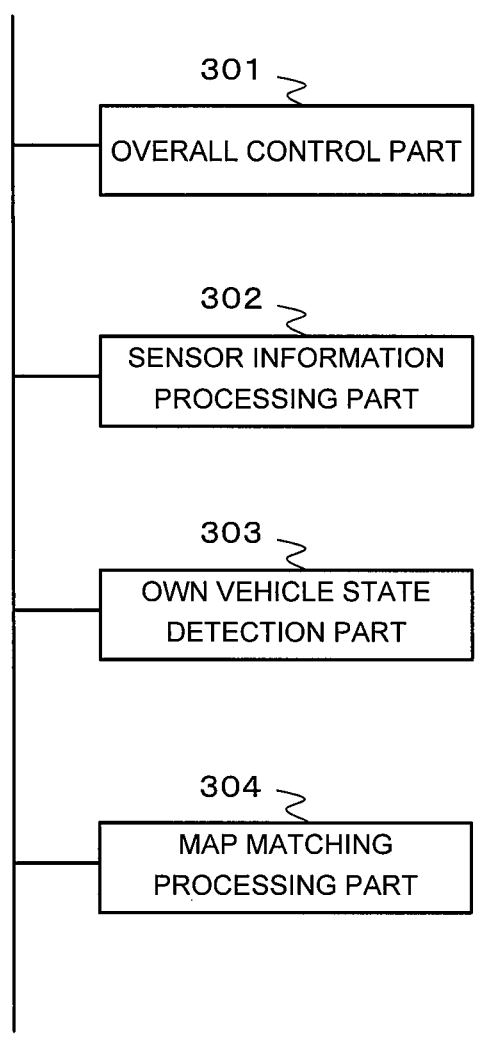
FIG. 3 is a diagram illustrating functional blocks according to the embodiment of the present invention.

FIG. 3 is a diagram illustrating functional blocks of the navigation device 100. The navigation device 100 includes an overall control part 301, a sensor information processing part 302, an own vehicle state detection part 303, and a map matching processing part 304.

The overall control part 301 is a central functional part for carrying out various processing for the navigation device 100. Specifically, the overall control part 301 receives various information and instructions from other functional parts, other devices and sensors built into the navigation device 100, and external devices. Moreover, the overall control part 301 outputs the acquired information and the received instructions to predetermined sensors, devices, and functional parts depending on types and contents of the information and the instructions.

The sensor information processing part 302 is a functional part for acquiring the vehicle sensor information, and temporarily storing the vehicle sensor information in the memory such as the RAM 3.

The own vehicle state detection part 303 is a functional part for using the vehicle sensor information to calculate state information on the own vehicle including information such as the own vehicle position and the vehicle direction. The state information is calculated each time the map matching processing is carried out, but the calculation interval is not limited thereto. For example, the own vehicle state detection part 303 may calculate the state information each time the vehicle travels a predetermined distance (such as 10 m).

Moreover, the own vehicle state detection part 303 calculates the position error and the direction error with respect to neighboring links. When the own vehicle state detection part 303 determines that the own vehicle is turning in calculation processing for the direction error, the own vehicle state detection part 303 generates a circular virtual link having a predetermined curvature radius between a link on which the own vehicle position exists and a link connecting to this link (hereinafter referred to as "post-turning link"). Moreover, the own vehicle state detection part 303 uses a virtual link direction at a predetermined position on the virtual link to calculate the direction error between the vehicle direction of the turning own vehicle and the link direction or the virtual link direction.

It should be noted that the own vehicle state detection part 303 temporarily stores the information such as the calculated own vehicle position, vehicle direction, position error, and direction error in a memory such as the RAM 3.

The map matching processing part 304 carries out the map matching processing of using predetermined information such as the own vehicle position and the error information (the position error and the direction error) to align the own vehicle position to a road (link) on a map displayed on the display 10. Specifically, the map matching processing part 304 uses the position error and the direction error calculated by the own vehicle state detection part 303 to calculate an evaluation amount for each of matching subject links. Moreover, the map matching processing part 304 identifies a matching subject link based on the calculated evaluation amounts, and aligns a car mark representing the current own vehicle position at a predetermined position on this link.

A description has been given of the functional blocks of the navigation device 100 according to this embodiment.

Figure 4:
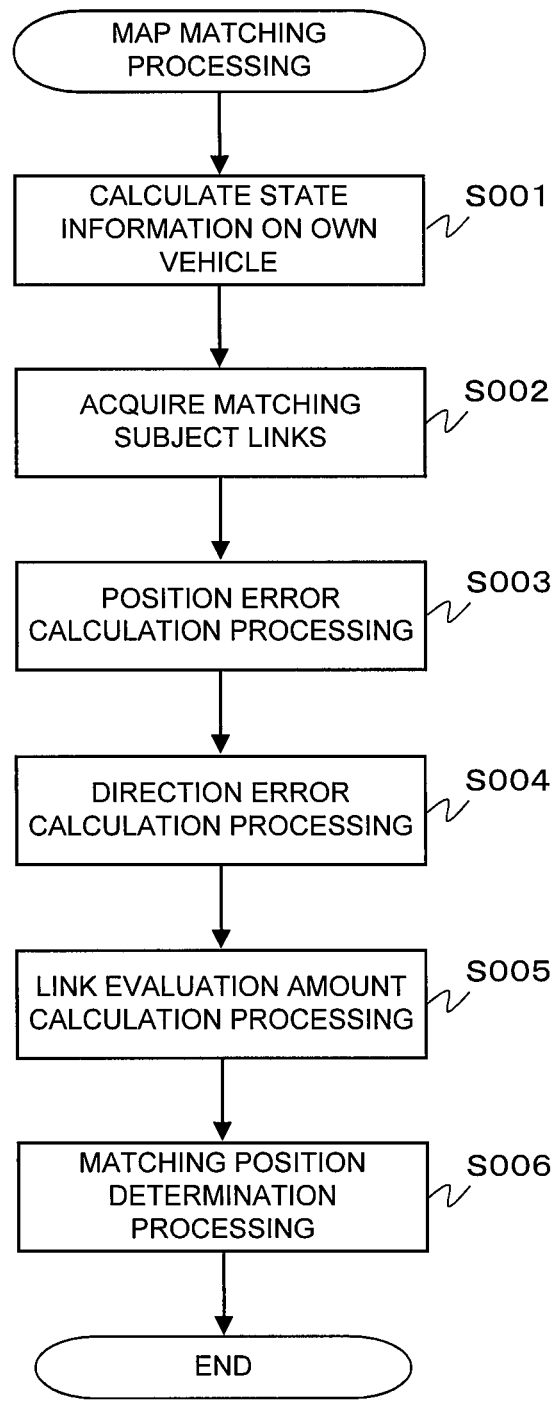
FIG. 4 is a flowchart illustrating map matching processing according to the embodiment of the present invention.

A description is now given of the map matching processing by the navigation device 100 according to this embodiment. FIG. 4 is a flowchart illustrating this processing. This flow is started when the navigation device 100 is started up.

First, the own vehicle state detection part 303 calculates the state information on the own vehicle including the own vehicle position and the vehicle direction on the map (Step S001). Specifically, the own vehicle state detection part 303 acquires the vehicle speed information output from the vehicle speed sensor 21 and the angular velocity information output from the gyro sensor 23, and temporally integrates distance information and angle information acquired by integrating respective pieces of information to calculate the own vehicle position (X',Y') after a travel (own vehicle travel) from an initial position (X, Y).

Moreover, the own vehicle state detection part 303, for example, integrates the angular velocity information output from the gyro sensor 23 to calculate the angle information on the vehicle, and calculates the vehicle direction, which is a travel direction of the own vehicle, based on the angle information. It should be noted that the own vehicle state detection part 303 temporarily stores the calculated own vehicle position and vehicle direction in a memory such as the RAM 3.

Then, the own vehicle state detection part 303 acquires the matching subject links (Step S002). Specifically, the own vehicle state detection part 303 acquires links within a predetermined range (such as a range having a radius of 500 m) from the own vehicle position from the link information 203.

Then, the own vehicle state detection part 303 calculates the position error to the matching subject link (Step S003). Specifically, the own vehicle state detection part 303 calculates the position error from the own vehicle position depending on a length of a perpendicular line drawn from the own vehicle position to the matching subject link. Moreover, the own vehicle state detection part 303 temporarily stores information on the calculated position error in a memory such as the RAM 3.

Figure 5:
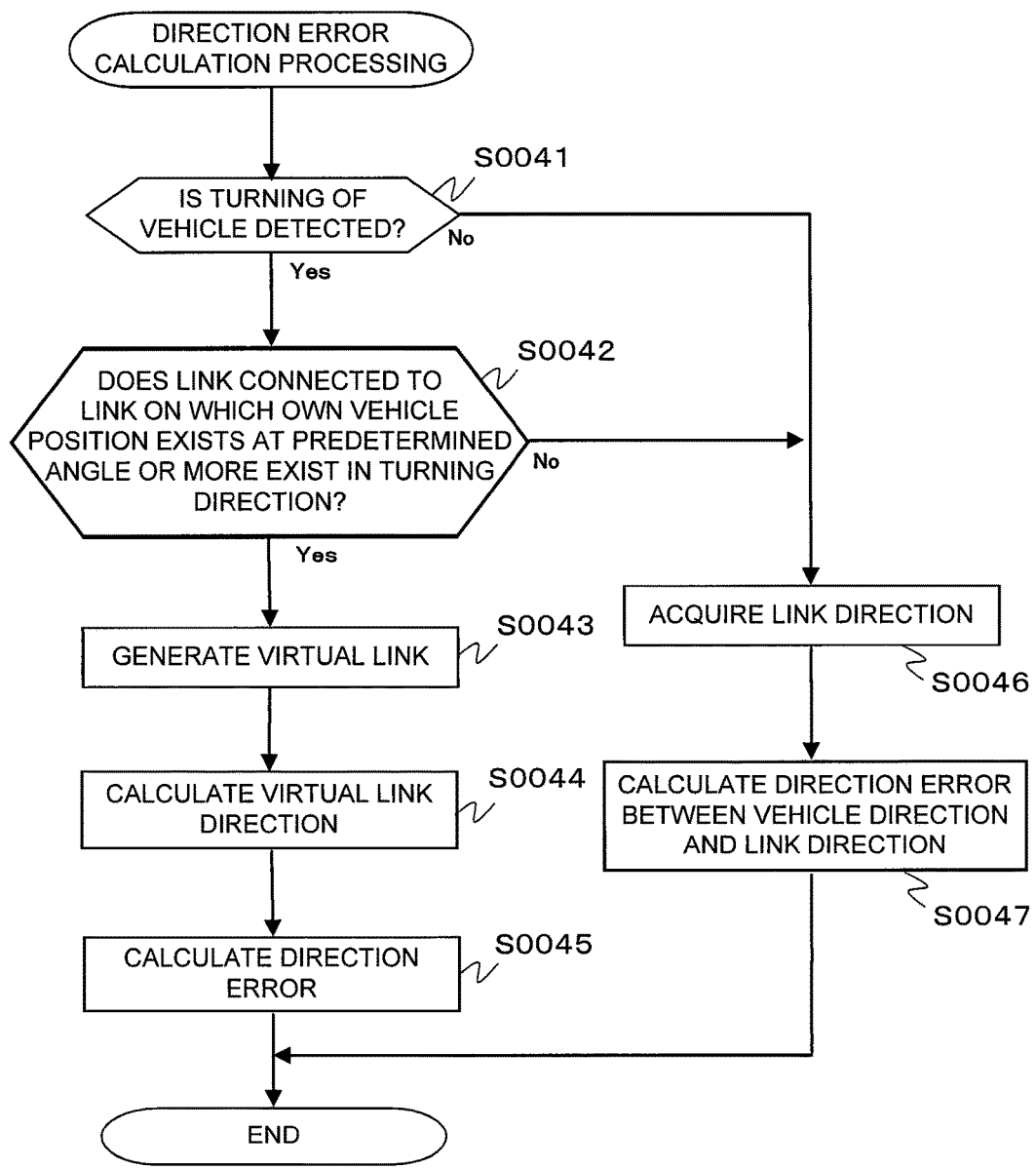
FIG. 5 is a flowchart illustrating direction error calculation processing according to the embodiment of the present invention.

Then, the own vehicle state detection part 303 calculates the direction error to the matching subject link (Step S004). FIG. 5 is a flowchart detailing the direction error calculation processing. As illustrated, the own vehicle state detection part 303 determines whether or not a turning of the vehicle is detected (Step S0041). Specifically, when the vehicle direction is equal to or more than a predetermined threshold (such as 4 degrees), the own vehicle state detection part 303 detects a turning of the vehicle.

When the own vehicle state detection part 303 does not detect a turning of the vehicle (No in Step S0041), the own vehicle state detection part 303 acquires the link direction of the matching subject link from the link information 203 (Step S0046), and calculates the direction error, which is the difference between the vehicle direction and the link direction (Step S0047). Moreover, the own vehicle state detection part 303 stores the calculated direction error in a memory such as the RAM 3, and finishes the direction error calculation processing.

On the other hand, when the own vehicle state detection part 303 detects a turning of the vehicle (Yes in Step S0041), the own vehicle state detection part 303 determines whether or not a link connected to the link on which the own vehicle position exists at a predetermined angle or more (such as 4 degrees or more) exists in the detected turning direction (Step S0042). Specifically, the own vehicle state detection part 303 determines whether or not a link connected to the link (link on which the own vehicle position exists) associated with the own vehicle position by the previous map matching processing at the predetermined angle or more exists.

Then, when a link connected at the predetermined angle or more exists (Yes in Step S0042), the own vehicle state detection part 303 proceeds to processing in Step S0043. On the other hand, when such a link does not exist (No in Step S0046), the own vehicle state detection part 303 proceeds to processing in Step S0047 described before.

Figure 6:
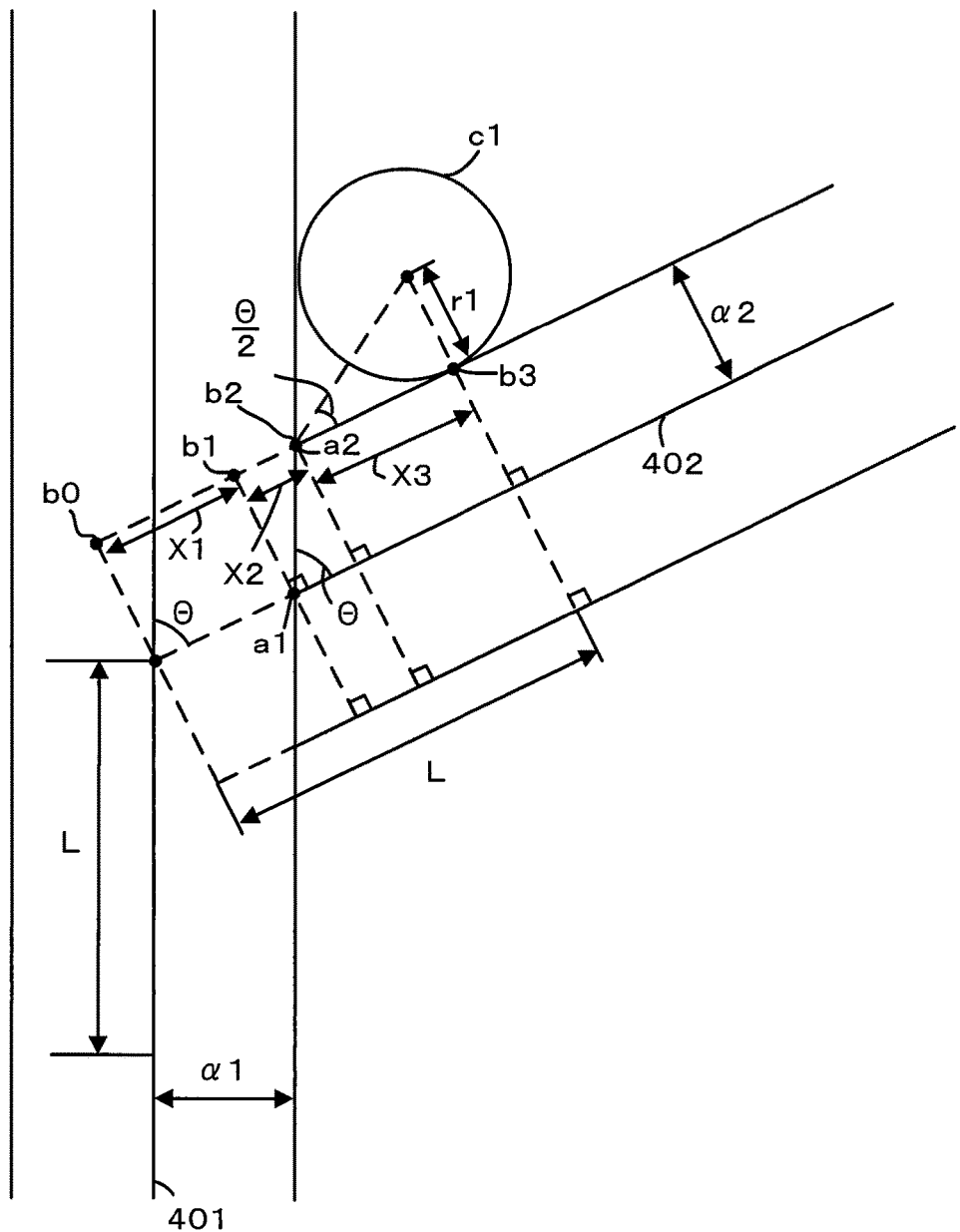
FIG. 6 is a diagram illustrating a connection example between a link on which an own vehicle position exists and a post-turning link according to the embodiment of the present invention.

In Step S0043, the own vehicle state detection part 303 generates a circular virtual link between the link on which the own vehicle position exists and the post-turning link connected to this link at the predetermined angle or more. FIG. 6 is a diagram illustrating a connection example of the two links. As illustrated, halves of widths of both of the links are represented as α1 and α2, and both of the links are connected so as not to pass inside a circle c1 having the minimum turning radius r1 (such as radius of 12 m) of the vehicle specified by the law. Moreover, perpendicular lines are drawn in a link width direction of a post-turning link 402 to intersections a1 and a2 between the post-turning link 402 and a link 401 on which the own vehicle position exists, a line segment from b0 to an intersection b1 is set as X1, and a line segment from an intersection b1 to an intersection b2 (=a2) is set as X2. Moreover, a line segment from an intersection b3 of a perpendicular line drawn from the center of the circle c1 having the minimum turning radius to the post-turning link 402 to the intersection b2 is set as X3.

When the virtual link is generated, the own vehicle state detection part 303 identifies the vehicle direction before the turning as a reference direction. Specifically, the own vehicle state detection part 303 identifies the vehicle direction calculated immediately before the turning of the vehicle as the reference direction.

Then, the own vehicle state detection part 303 calculates a turning start distance L. The turning start distance L is approximately the same as a turning end distance. Therefore, for the sake of convenience, the turning end distance is calculated, and is treated as the turning start distance L.

On this occasion, the turning start distance L is acquired as X1+×2+×3. X1 is acquired by:

(road width of link 401 on which own vehicle position exists/2)/(absolute value of (sin(direction difference between link 401 on which own vehicle position exists and post-turning link 402))

Moreover, X2 is acquired by:

(road width of post-turning link 402/2)/(absolute value of (tan(direction difference between link 401 on which own vehicle position exists and post-turning link 402))

Moreover, X3 is acquired by:

(minimum turning radius r1 of vehicle)/(absolute value of (tan(direction difference between link 401 on which own vehicle position exists and post-turning link 402/2))

Specifically, X1, X2, and X3 are acquired by the following equations 1, 2, and 3.

$$X1 = \frac{\alpha 1}{|\sin\theta|} \quad (1)$$

$$X2 = \frac{\alpha 2}{|\tan\theta|} \quad (2)$$

$$X3 = \frac{r1}{\left|\tan\left(\frac{\theta}{2}\right)\right|} \quad (3)$$

Figure 7:
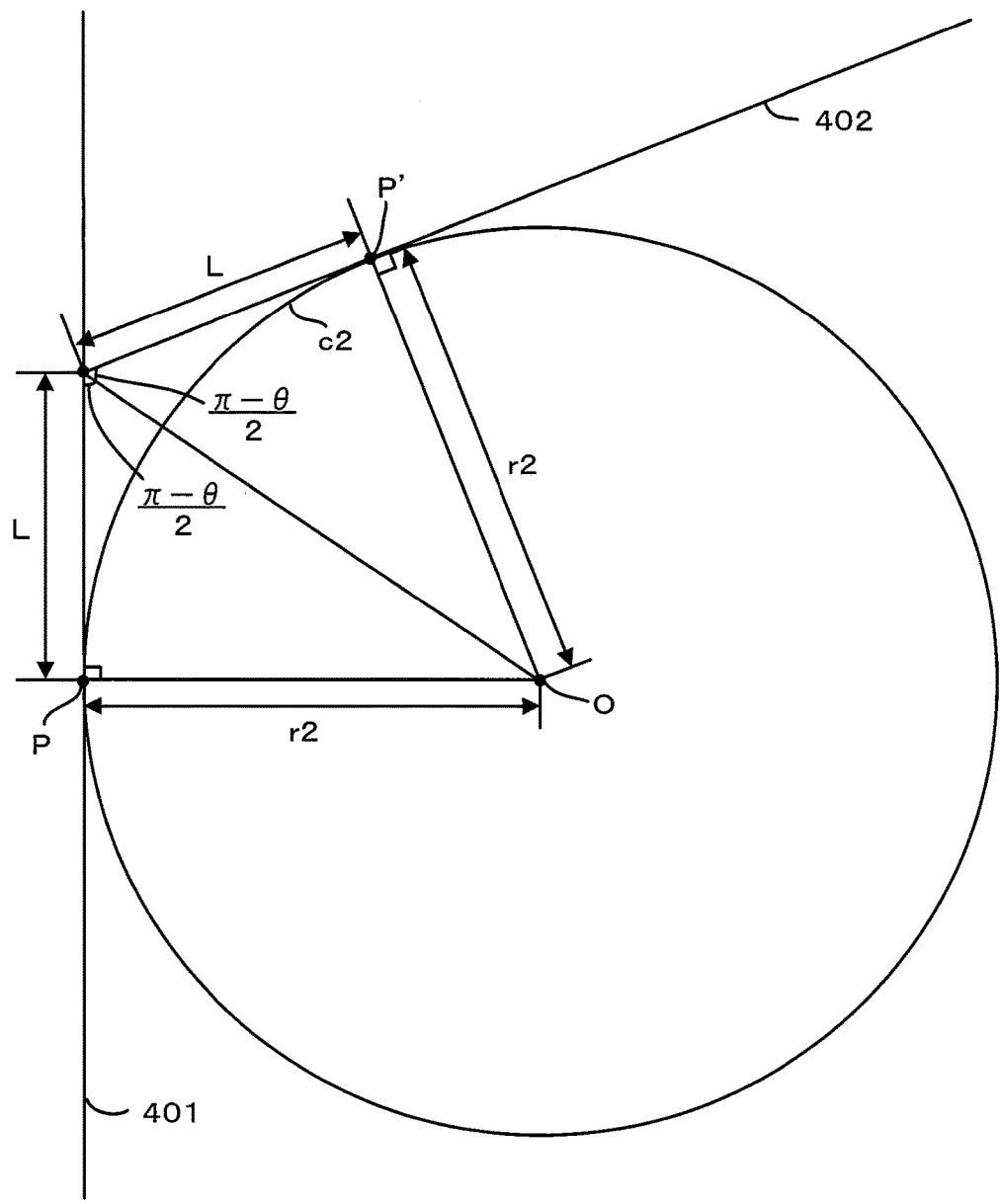
FIG. 7 is a diagram illustrating a virtual link generated between the link on which the own vehicle position exists and the post-turning link according to the embodiment of the present invention.

Then, the own vehicle state detection part 303 uses the calculated turning start distance L to calculate a curvature radius of the virtual link. FIG. 7 is a diagram illustrating a virtual link c2 generated between the link 401 on which the own vehicle position exists and the post-turning link 402. On this occasion, a curvature radius r2 of the virtual link c2 is acquired by:

turning start distance L×absolute value of tan((π-direction difference between link 401 on which own vehicle position exists and post-turning link 402)/2)

Specifically, the curvature radius r2 of the virtual link is acquired by the following equation 4.

$$r2 = \left|L \times \tan\left(\frac{\pi - \theta}{2}\right)\right| \quad (4)$$

When the virtual link c2 having the curvature radius of r2 is generated, a part of the virtual link c2 constitutes an arc connecting a turning start point P and a turning end point P'. The arc has a shape close to an actual turning behavior of the vehicle.

Then, the own vehicle state detection part 303 uses the generated virtual link c2 to calculate a link direction (hereinafter referred to as "virtual link direction") at a predetermined position on the virtual link c2 (Step S0044). When the virtual link direction is calculated, the own vehicle state detection part 303 calculates a turning passage distance M.

Figure 8:
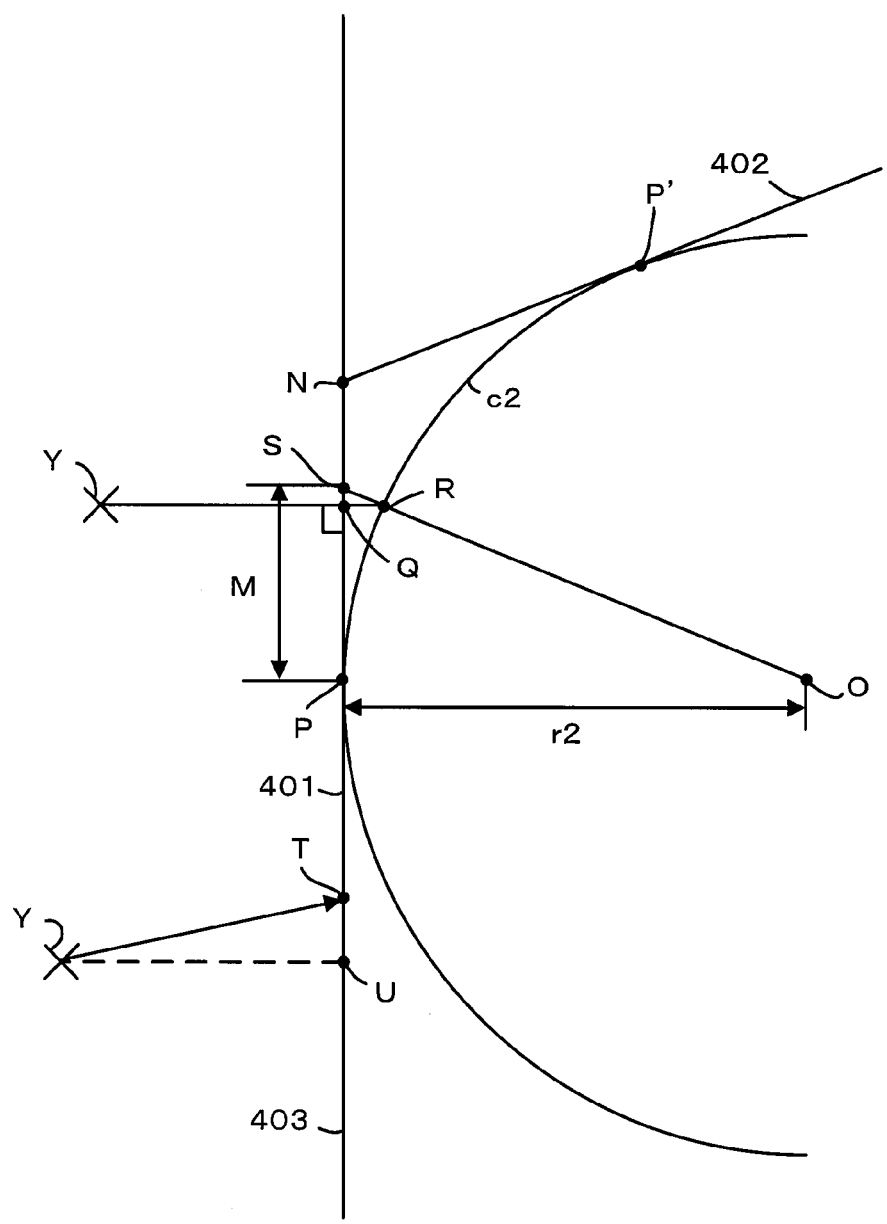
FIG. 8 is a diagram illustrating a turning passage distance in a case where a direction difference angle between the link on which the own vehicle position exists and the post-turning link is an obtuse angle according to the embodiment of the present invention.

FIG. 8 illustrates the turning passage distance M. As illustrated, a perpendicular line is drawn from an own vehicle position Y identified by the vehicle sensor information to the link 401 on which the own vehicle exists, which is represented by a line segment delimited between N and T, and an intersection thereof is set to Q. Moreover, the perpendicular line is extended to the virtual link c2, and an intersection between the perpendicular line and the arc of the virtual link c2 is set to R. Moreover, an intersection of an extension of a line connecting between a center O of the virtual link c2 and the intersection R with the link 401 on which the own vehicle exists is set as an intersection S. On this occasion, the intersection S is a position of the own vehicle position projected on the link. The own vehicle state detection part 303 calculates a distance from the turning start point P to the intersection S as the turning passage distance M.

If the perpendicular line cannot be drawn from the own vehicle position to the link on which the own vehicle exists, the own vehicle state detection part 303 acquires a distance from a terminal point T of a link 403 on which a perpendicular line is drawn to the turning start point P as the turning passage distance. On this occasion, the own vehicle state detection part 303 identifies a terminal point smaller in distance from an intersection U between the perpendicular line drawn from the own vehicle position and the link 403 as the terminal point T of the link 403. Moreover, the turning start point P constitutes the reference point, and hence the sign of the calculated turning passage distance is negative in this case.

Figure 9:
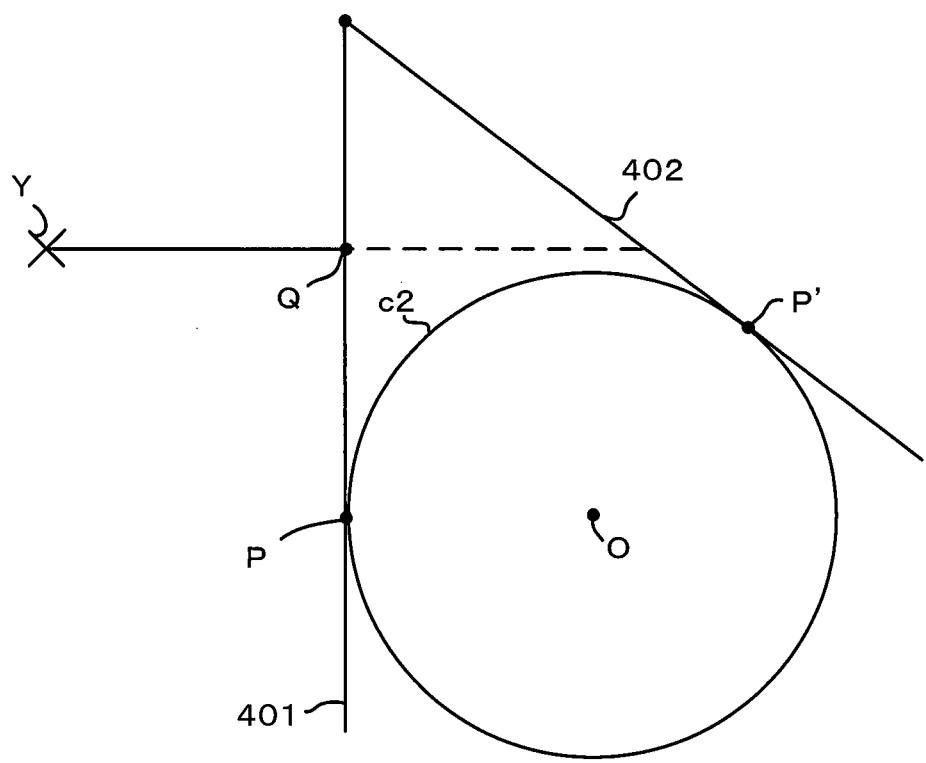
FIG. 9 is a diagram illustrating the turning passage distance in a case where the direction difference angle between the link on which the own vehicle position exists and the post-turning link is an acute angle according to the embodiment of the present invention.

Moreover, as illustrated in FIG. 9, if the direction difference angle between the link 401 on which the own vehicle exists and the post-turning link 402 is an acute angle, the perpendicular line drawn from the own vehicle position may not intersect with the virtual link c2. In this case, the own vehicle state detection part 303 sets the turning start distance L as the turning passage distance.

Then, the own vehicle state detection part 303 calculates a direction variation at a predetermined position on the virtual link c2. Specifically, when the turning passage distance M≤0, or when the turning passage distance M>the turning start distance L×2, the own vehicle state detection part 303 sets the direction variation to 0.

Figure 10:
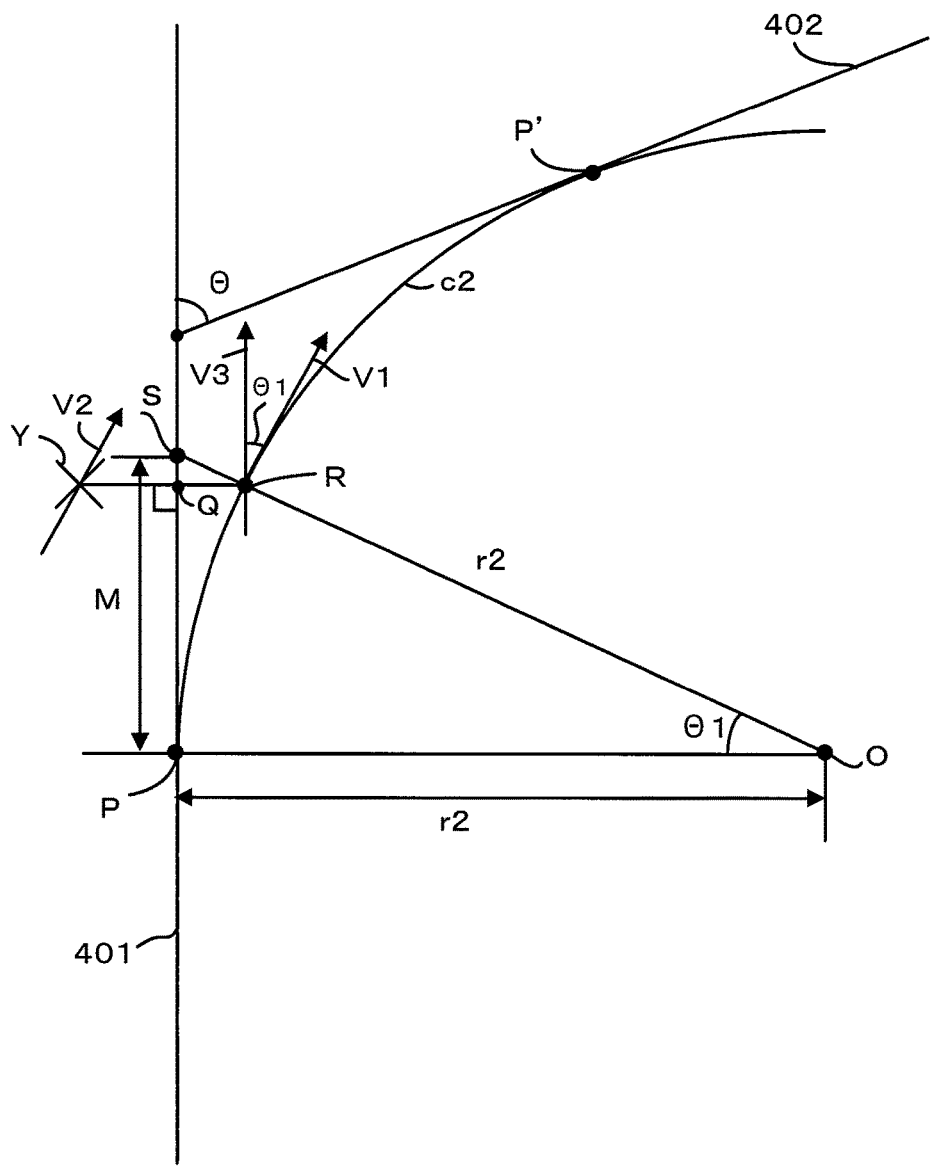
FIG. 10 is a diagram illustrating a direction variation $\theta 1$ of the virtual link according to the embodiment of the present invention.

Moreover, as illustrated in FIG. 10, when 0<the turning passage distance M<the turning start distance L, the own vehicle state detection part 303 calculates the direction variation as follows.

direction variation θ1=arctan(turning passage distance $M$/curvature radius $r2$ of virtual link $c2$)

Specifically, the direction variation θ1 is acquired by the following equation 5.

$$\theta 1 = \arctan\frac{M}{r2} \quad (5)$$

Figure 11:
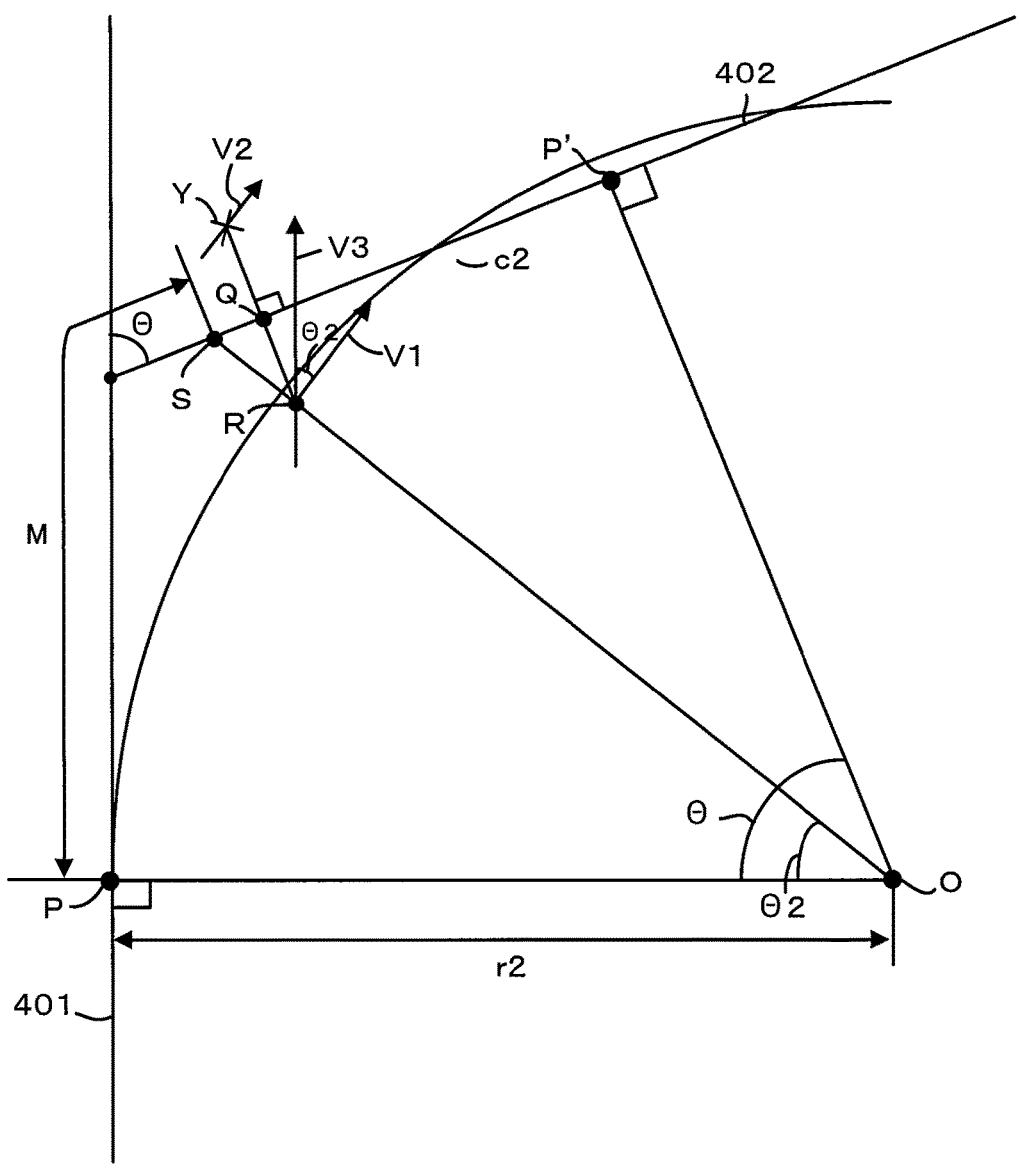
FIG. 11 is a diagram illustrating a direction variation $\theta 2$ of the virtual link according to the embodiment of the present invention.

Moreover, as illustrated in FIG. 11, when the turning start distance L<the turning passage distance M≤the turning start distance L×2, the own vehicle state detection part 303 calculates the direction variation as follows.

direction variation θ2=(absolute value of direction difference between link 401 on which own vehicle exists and post-turning link 402)−arctan (turning start distance $L$×2−turning passage distance $M$)/curvature radius $r2$ of virtual link $c2$ Specifically, the direction variation θ2 is acquired by the following equation 6.

$$\theta 2 = |\theta| - \arctan\frac{2L-M}{r2} \quad (6)$$

Then, the own vehicle state detection part 303 uses the direction variation to calculate a virtual link direction V1. Specifically, the own vehicle state detection part 303 calculates the virtual link direction V1 as follows.

For right turn: reference direction−direction variation

For left turn: reference direction+direction variation

Then, the own vehicle state detection part 303 calculates the direction error between a vehicle direction V2 calculated from the vehicle sensor information and the virtual link direction V1 (Step S0047). Specifically, the own vehicle state detection part 303 determines whether or not the vehicle direction V2 is included in a range between a reference direction V3 and the virtual link direction V1. Then, when the vehicle direction V2 is included in the range, the own vehicle state detection part 303 sets the direction error to a predetermined value (such as 0).

On the other hand, when the vehicle direction V2 is not included in the range, the own vehicle state detection part 303 calculates a smaller one of a difference from the virtual link direction V1 and a difference from the reference direction V3 as the direction error with respect to the matching subject link. Specifically, the own vehicle state detection part 303 calculates respectively the difference between the vehicle direction V2 and the virtual link direction V1 and the difference between the vehicle direction V2 and the reference direction V3, and sets a smaller difference thereof as the direction error.

After the direction error is acquired as described above, the own vehicle state detection part 303 finishes the direction error calculation processing. When the direction error calculation processing is finished, the map matching processing part 304 carries out link evaluation amount calculation processing (Step S005 in FIG. 4).

In Step S005, the map matching processing part 304 uses the position error and the direction error to calculate the evaluation amounts of the matching subject links. For example, the map matching processing part 304 applies predetermined weighting to the position error and the direction error, adds the weighted position error and direction error to each other, and acquires an average thereof to calculate the link evaluation amount.

Then, the map matching processing part 304 uses the calculated link evaluation amounts to identify a matching subject link highest in evaluation amount, and applies the map matching processing to the identified link. Specifically, the map matching processing part 304 determines a matching position on the link based on the position error and the direction error between the own vehicle position and the identified link (Step S006). Moreover, the map matching processing part 304 carries out processing to align the car mark representing the own vehicle position to the determined position on the link. It should be noted that the map matching processing part 304 repeats the processing from Step S001 to Step S006 while the navigation device 100 is activated.

The vehicle position detection device according to this embodiment can acquire the direction error of the vehicle so that a more appropriate result is acquired in the subsequent processing (such as map matching processing). In particular, the use of the virtual link c2 acquired by considering the link widths of the link 401 on which the own vehicle exists and the post-turning link 402 enables the calculation of a more appropriate direction error at a location such as an intersection where the turning behavior occurs.

The circular virtual link c2 is generated, and the direction at the predetermined position on the virtual link c2 is acquired according to this embodiment, but the shape of the virtual link c2 is not limited according to the present invention. For example, an ellipsoidal virtual link may be generated, or a closed shape partially having a predetermined curved shape may be generated as the virtual link.

Moreover, the virtual link c2 having the curvature radius r2 determined by the calculated turning start distance L is generated according to this embodiment, but the present invention is not limited to this embodiment. According to a modified example of this embodiment, the turning start distance L is not calculated, and, for example, a stored virtual link associated with the link widths and the direction difference angle between the links is used to calculate the direction error.

FIG. 12 shows virtual link model information 500 stored in advance in the navigation device 100 according to the modified example. As illustrated, the virtual link model information 500 includes records each associated with a link width 501 of a link A, a link width 502 of a link B, a direction difference angle β between both of the links, and a virtual link (arc) generated at an appropriate curvature radius in advance depending on the link widths and the direction difference angle.

The virtual link model information 500 is used by, for example, the direction error calculation processing. Specifically, when the own vehicle state detection part 303 detects a turning of the vehicle, the own vehicle state detection part 303 acquires the link widths of the link 401 on which the own vehicle position exists and the post-turning link 402 from the link information 203. Moreover, the own vehicle state detection part 303 calculates the direction difference angle between both of the links. Then, the own vehicle state detection part 303 identifies a record associated with values close the link widths and the direction difference angle of both of the links, and extracts the virtual link stored in the record. Then, the own vehicle state detection part 303 uses the extracted virtual link to calculate the direction error.

The vehicle position detection device according to the modified example can calculate a more appropriate direction error. In particular, the virtual link is generated in advance, and a load imposed by the calculation processing can thus be reduced compared with the case where the turning start distance L is used to generate the virtual link c2. Moreover, the reduction in the load imposed by the calculation processing results in more quick and more precise processing such as the map matching subsequent to the detection of the turning start.

Moreover, the direction error calculated by the embodiment is not used only for the map matching processing, and may be used for, for example, determining a state (free state) where the own vehicle position does not belong to any links on the map. Moreover, the generated virtual link is not used only for the calculation of the direction error, but may be used to align the car mark representing the own vehicle position during the turning of the vehicle to the arc of the virtual link, and to move the car mark along the arc, thereby displaying a smooth turning movement of the vehicle.

REFERENCE SIGNS LIST

100 . . . navigation device, 1 . . . calculation processing device, 10 . . . display, 11 . . . storage device, 13 . . . sound input/output device, 16 . . . input device, 20 . . . ROM device, 21 . . . vehicle speed sensor, 22 . . . acceleration sensor, 23 . . . gyro sensor, 24 . . . GPS reception device, 25 . . . FM multiplex broadcast reception device, 26 . . . beacon reception device

The invention claimed is:

1. A vehicle position detection device, comprising:
a central processing unit; and
a memory coupled to the central processing unit;
wherein the central processing unit is programmed to:
generate a virtual link that connects a turning start point on a pre-turning link and a turning end point on a post-turning link, by using a turning start distance calculated based on a link width of the pre-turning link and a link width of the post-turning link;
calculate a virtual link direction that is a direction at a predetermined position on the virtual link;
calculate a direction error of a vehicle direction based on the virtual link direction;
identify a matching subject link based on the direction error;
use the turning start distance to generate the virtual link;
wherein the virtual link is generated based on the link width of the pre-turning link, the link width of the post-turning link, and a direction difference angle between the pre-turning link and the post-turning link; and
align a car mark, representing a current vehicle position of a vehicle, to the matching subject link on a map, and move the car mark along the matching subject link during a turning movement of the vehicle.

2. The vehicle position detection device according to claim 1, wherein the virtual link is generated based also on a minimum turning radius between the pre- turning link and the post-turning link.

3. The vehicle position detection device according to claim 1, wherein the central processing unit extends a perpendicular line drawn from a virtual current position acquired by a sensor value to the pre-turning link, and calculates a direction at an intersection between an extension of the perpendicular line and the virtual link as the virtual link direction.

4. The vehicle position detection device according to claim 3, wherein the central processing unit is programmed to:
use, when the vehicle direction is included in a predetermined range between the virtual link direction and a reference direction that is a direction of the pre-turning link, a predetermined value as the direction error; and
use, when the vehicle direction is not included in the predetermined range, a smaller one of a direction error between the vehicle direction and the reference direction and a direction error between the vehicle direction and the virtual link direction as the direction error.

5. The vehicle position detection device according to claim 4, wherein the central processing unit uses an arc of a circle that is externally tangent to the pre-turning link and the post-turning link to calculate the virtual link.

6. A method for determining a direction error of a vehicle direction, the method comprising:
generating, by a central processing unit, a virtual link that connects a turning start point and a turning end point on a post-turning link, by using a turning start distance calculated based on a link width of the pre-turning link and a link width of the post- turning link;
calculating, by the central processing unit, a virtual link direction that is a direction at a predetermined position on the virtual link;
calculating, by the central processing unit, the direction error of the vehicle direction based on the virtual link direction;
identifying, by the central processing unit, a matching subject link based on the direction error;
wherein the virtual link is generated based on the turning start distance; and
wherein the link width of the pre-turning link, the link width of the post-turning link, and a direction difference angle between the pre-turning link and the post-turning link; and
aligning a car mark, representing a current vehicle position of a vehicle, to the matching subject link on a map, and moving the car mark along the matching subject link during a turning movement of the vehicle.

7. The method according to claim 6, wherein a minimum turning radius between the pre-turning link and the post-turning link is also used to generate the virtual link.

8. The method according to claim 6, wherein a perpendicular line drawn from a virtual current position acquired by a sensor value to the pre-turning link is extended, and a direction at an intersection between an extension of the perpendicular line and the virtual link is calculated as the virtual link direction.

9. The method according to claim 8, wherein
when the vehicle direction is included in a predetermined range between the virtual link direction and a reference direction that is a direction of the pre-turning link, a predetermined value is used as the direction error; and
when the vehicle direction is not included in the predetermined range, a smaller one of a direction error between the vehicle direction and the reference direction and a direction error between the vehicle direction and the virtual link direction is used as the direction error.

10. The method according to claim 9, wherein an arc of a circle that is externally tangent to the pre-turning link and the post-turning link is used to calculate the virtual link.

* * * * *